United States Patent [19]
Jander

[11] Patent Number: 5,966,206
[45] Date of Patent: Oct. 12, 1999

[54] INTERLOCKED HIGH POWER FIBER SYSTEM USING OTDR

[75] Inventor: Ralph Brian Jander, Coopersburg, Pa.

[73] Assignee: Tyco Submarine Systems Ltd., Morristown, N.J.

[21] Appl. No.: 08/728,656

[22] Filed: Oct. 10, 1996

[51] Int. Cl.$^6$ .................................................. G01N 21/88
[52] U.S. Cl. ........................................................ 356/73.1
[58] Field of Search ........................................... 356/73.1

[56] References Cited

U.S. PATENT DOCUMENTS

| | | | |
|---|---|---|---|
| 3,981,562 | 9/1976 | Williams | 356/237 |
| 4,716,288 | 12/1987 | Doi | 356/73.1 X |
| 5,012,087 | 4/1991 | Rockstroh et al. | 356/73.1 X |
| 5,251,001 | 10/1993 | Dave et al. | 356/73.1 |
| 5,270,537 | 12/1993 | Jacobs | 356/73.1 |

OTHER PUBLICATIONS

Steve Newton, "A New Technique in O.T.D.R.," Electronics & Wireless World, pp. 496–500 and 557–560. (No Date).

J.N. Ross, "Design Note: A Photon Arrival Timer For High–Resolution Optical Time Domain Reflectometry," Meas. Science Technology, Mar. 19, 1990, pp. 828–830.

P. Healey, Review Article, "Instrumentation Principles for Optical Time Domain Reflectometry", J. Phys. E: Sci. Instrum. 19 (1986) (8 pages).

International Standard, CFI IEC 825–1, "Part 1: Safety of Laser Products—Equipment Classification, Requirements and User's Guide," First Edition, 1993, pp. 1–207.

International Standard, CFI IEC 825–2, "Part 2: Safety of Laser Products—Safety of Optical Fibre Communication Systems," First Edition, 1993, pp. 1–31.

*Primary Examiner*—Vincent P. McGraw
*Attorney, Agent, or Firm*—Mark K. Young

[57] ABSTRACT

The in-fiber safety interlock system includes a high power (Class IV) laser interlocked to an OTDR. A plurality of WDM data signals are transmitted over the fiber system, including a terminal portion and an extended portion. A control circuit is connected to the laser and the OTDR. The OTDR monitors the integrity of the fiber system, including both the terminal portion and the extended portion. If the OTDR detects a fault in the optical transmission path, the OTDR and the control circuit operate to automatically disable or shut down the laser.

18 Claims, 3 Drawing Sheets

10

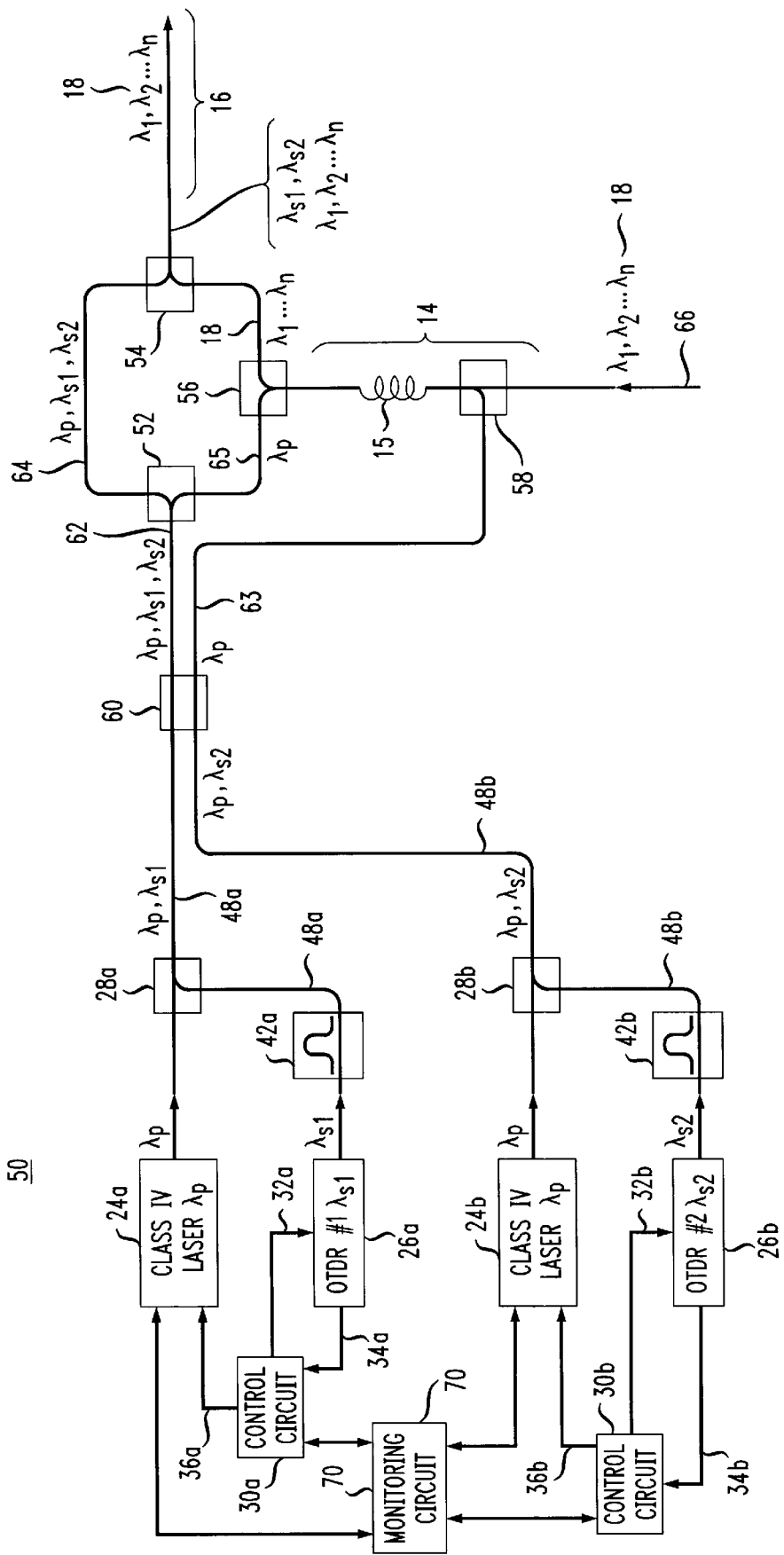

INTERLOCKED HIGH POWER FIBER SYSTEM USING OTDR

BACKGROUND

The present invention relates to optical fiber communication systems and more particularly to a safety interlocked high power fiber system using an OTDR.

Fiber optic technology has evolved significantly since the invention of the laser. Semiconductor lasers, fiber and devices have been continuously improved in support of increasingly sophisticated fiber communication systems. For some time, practical fiber communication systems employed optical power levels less than 10 mW. A new generation of lasers and devices are now capable of producing much greater power.

Semiconductor laser diodes once capable of producing only a few milliwatts of optical power now can deliver several hundred milliwatts. These high power Class IV lasers can be used individually or in combination to pump rare-earth doped fiber amplifiers and fiber lasers to yield more than a watt of infrared coherent fiber-coupled power.

To practically realize high power fiber transmission systems, one problem which must be addressed is the safe deployment of high power carrying fibers. Industry standards and laws of certain countries prohibit the operation or installation of Class IV laser systems without some type of interlocking safety system to prevent inadvertent release of high energy optical levels from the laser. To Applicant's knowledge, no exclusion exists specifically for closed fiber transmission systems. In the event of a fiber break in a high power fiber transmission system, the harmful laser emissions from the broken fiber pose an extreme hazard and can cause severe injuries such as burnt retinas or damage to other living tissues and may cause fires or other property damage. In addition, pumping a high powered laser into a system having broken fiber can severely damage the optical fiber system due to fiber fusion. For many reasons, therefore, it is important to shut down a high power laser as soon as possible after a break or fault occurs in the extended fiber system. No safety systems exist for use in an extended fiber system for automatically shutting down the high power laser when there is a break in the fiber.

Therefore, a need exists for a safety interlocking system that interlocks with the high power laser for automatically shutting down or disabling the laser when a fault or break is detected in an extended fiber system.

SUMMARY OF THE INVENTION

The in-fiber safety interlock system of the present invention provides a system for monitoring an extended fiber system and automatically enabling or disabling a high power laser soource based on the detection of fiber path integrity.

In accordance with an embodiment of the present invention, a high power (Class IV) laser transmits high power optical signals over a fiber system including a terminal (local and accessible, e.g., on shore) portion and an extended (remote and unaccessible, e.g., under sea) portion. A plurality of WDM data signals may be transmitted over the fiber system. The terminal portion includes a local optical amplifier and the extended portion may include a remote optical amplifier. The laser provides pump energy for the optical amplification.

The laser is interlocked to an optical time domain relfectometer (OTDR) which monitors the integrity of the fiber system, including both the terminal portion and the extended portion. The OTDR monitors the integrity of the optical path by transmitting a periodic or continuous low power (Class I) optical pulse train and monitors the return signal. In this manner, the OTDR can detect path integrity and the presence of any faults in the fiber system, such as fiber breaks or problems with components.

A control circuit is connected to both the laser and the OTDR. When the OTDR senses path integrity, the high power laser source is enabled. When the OTDR detects a fault in the optical transmission path, the OTDR and the control circuit operate to automatically disable (cease to enable) or shut down the laser. In this manner, the present invention provides an in-fiber interlocking system using an OTDR that continuously senses the integrity of the extended fiber system so that the high power laser can be safely employed.

In another embodiment of the present invention, multiple high power lasers each operating at a different wavelength are connected to a single fiber system, which may include a remote optical amplifier. Each laser is separately interlocked to its own sensing OTDR having a unique wavelength. Each OTDR is connected to a discriminating bandpass filter so that each OTDR monitors only its own return signal.

In yet another embodiment, multiple redundant high power lasers are connected to a local amplifier which produces high signal powers in a single fiber system. Each laser is interlocked to its own OTDR. The path monitored by the OTDRs includes an extended portion of the fiber path which carries high power amplified signals. The lasers may operate together or separately. The operation of the lasers may be automatically adjusted or coordinated based on power requirements of the fiber system and whether any of the lasers have been disabled.

BRIEF DESCRIPTION OF THE DRAWINGS

FIG. 3 illustrates a block diagram of an in-fiber safety interlock system according to a third embodiment of the present invention.

DETAILED DESCRIPTION

Figure 1:
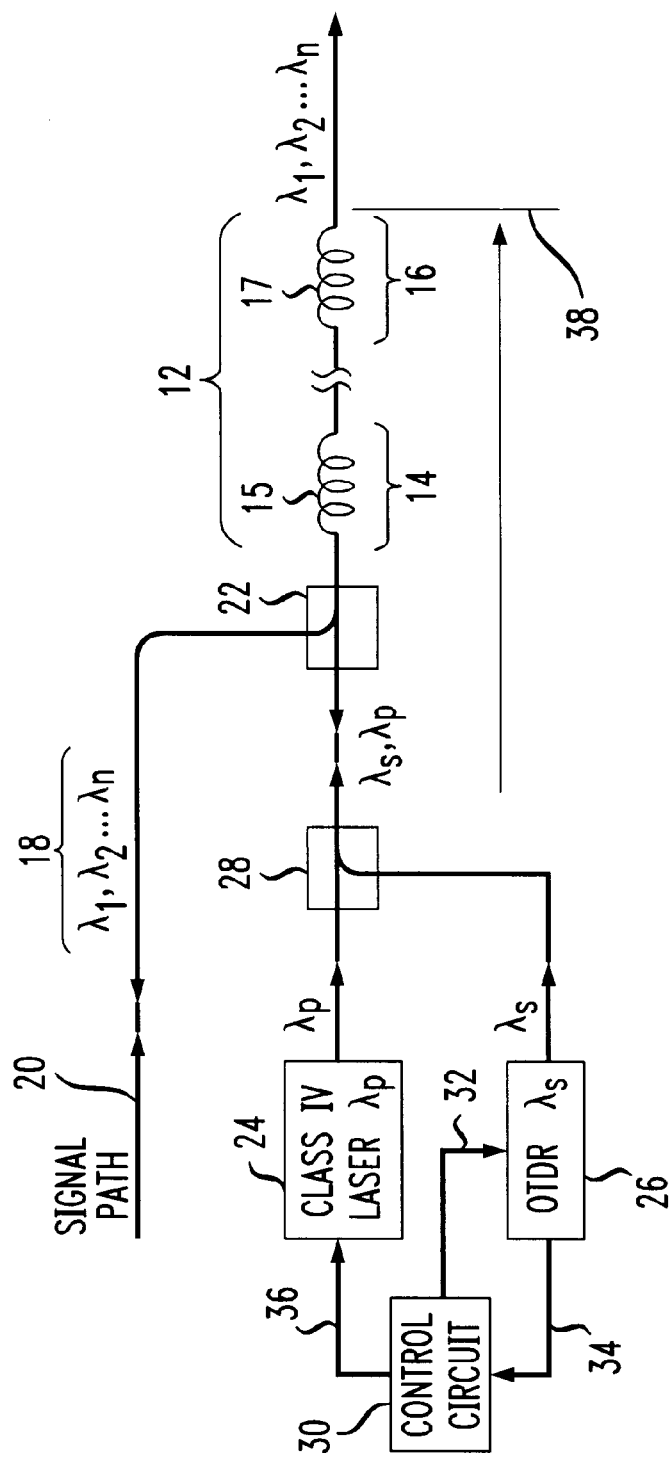
FIG. 1 illustrates a block diagram of an in-fiber safety interlock system according to a first embodiment of the present invention.

Referring to the drawings in detail, wherein like numerals indicate like elements, FIG. 1 illustrates a block diagram of an in-fiber safety interlock system according to a first embodiment of the present invention. The safety interlock system 10 includes an optical fiber system 12 including a terminal portion 14 and an extended portion 16 for carrying or transmitting a plurality of optical signals. Terminal portion 14 may include a local optical amplifier 15, while extended portion 16 may include a remote optical amplifier 17. Amplifiers 15 and 17 may comprise, for example, doped fiber amplifiers or stimulated Raman amplifiers. Fiber system 12, for example, may be used in a long-haul under sea fiber optic transmission system in which terminal portion 14 is located on-shore and extended portion 16 is located under sea. The extended portion 16 of fiber system 12 may extend 40–60 Km or more undersea. One or more optical signals each operating at a different wavelength can be simultaneously transmitted over fiber system 12 using wavelength division multiplexing (WDM).

A plurality of WDM data signals 18 having wavelengths $\lambda_1 \lambda_2 \ldots \lambda_n$ are carried over data signal path 20. Data signals 18 are connected to fiber system 12 by optical coupler 22. Signal path 20 and fiber system 12 can be bidirectional. The present invention can also operate with alternative optical fiber arrangements.

Safety interlock system 10 also includes a high power (Class IV) laser 24 transmitting high power at a wavelength $\lambda_p$. Laser 24 can be used as a pump laser to pump optical energy to optical amplifiers 15 and/or 17 within fiber system 12 to amplify data signals 18. An optical time-domain reflectometer (OTDR) 26 monitors the continuity or integrity of an optical path which can include the fiber extending from the output of OTDR 26 and fiber system 12 (including terminal portion 14 and extended portion 16). OTDR 26 monitors the continuity or integrity of the optical path by transmitting a periodic or continuous low power optical pulse train at wavelength $\lambda_s$ and monitoring the small fraction of light at wavelength $\lambda_s$ that is scattered back to OTDR 26. In particular, detection, threshold and/or comparison circuitry within OTDR 26 detect the continuity or integrity of the optical fiber path of the system and/or significant changes in path continuity, or of a certain length of the optical fiber path. OTDR 26 can detect the continuity or integrity and/or changes in continuity of the optical path extending out to end point 38. As a result, the protection range of interlock system 10 extends only out to end point 38.

OTDR 26 may comprise a simplified OTDR having only a subset of the features or capabilities present on most off-the-shelf OTDRs to reduce the expense of the system. Although commercially available OTDRs typically include many features and capabilities, the present invention may only require an OTDR having the ability to determine the integrity of an optical path of a specified distance. Some aspects of the present invention may also require (or benefit from) the OTDR to also identify the location of any faults or fiber breaks detected in the system.

Optical coupler 28 is connected by fiber to laser 24, OTDR 26 and coupler 22 and combines the optical signals transmitted by laser 24 ($\lambda_p$) and OTDR 26 ($\lambda_s$). Coupler 22 combines the OTDR output signal ($\lambda_s$), the laser output signal ($\lambda_p$), and data signals 18 ($\lambda_1 \lambda_2 \ldots \lambda n$) for transmission over fiber system 12. Each of these signals has a different wavelength.

Control circuit 30 is connected to laser 24 and OTDR 26 for selectively enabling or disabling laser 24 based on information received from OTDR 26. Control circuit 30 may comprise a microprocessor and/or other circuitry. A "test distance" input 32 from control circuit 30 indicates to OTDR 26 the distance of the optical path that should be monitored. OTDR 26 can perform a built-in self test and outputs an "OTDR OK" signal over output 34 to indicate that the OTDR is working properly. The detection and threshold circuitry of OTDR 26 detects the presence or absence of continuity or integrity and/or significant changes in optical path losses of the optical path extending from OTDR 26 a distance specified by the "test distance" input 32, and outputs a "clear-path present/absent" signal on output 34. Control circuit 30 enables laser 24 by outputting a "laser enable" signal over output 36 only when OTDR 26 is working properly (based on state of "OTDR OK" signal) and OTDR 26 has confirmed the integrity or continuity of the optical path (based on state of "clear-path present/absent" signal). Otherwise, control circuit 30 disables or shuts down laser 24 by outputting a "laser disable" signal over output 36.

The operation of the in-fiber safety interlock system 10 according to a first embodiment of the present invention may be understood with reference to FIG. 1. High power laser 24 is interlocked to OTDR 26 via control circuit 30. Prior to activating laser 24, the OTDR must be self tested and the integrity of the fiber path of the system must be confirmed to avoid harmful laser emissions from a broken fiber or other faults in the system.

Prior to operation and/or during its operation, OTDR 26 performs a built-in self test. If the OTDR fails its built-in self test, a signal is output over output 34 from OTDR 26 to control circuit 30 to indicate that OTDR 26 is not working properly. Control circuit then outputs a "clear-path absent" signal on output 34 to laser 24, thereby disabling (or failing to enable) laser 24 because the faulty OTDR 26 cannot be relied upon to accurately monitor the integrity of the system optical path. Alternatively, control circuit 30 may be eliminated and the "clear-path present/absent" signal on output 34 may be input directly to laser 24.

When OTDR 26 passes its built-in self test, OTDR 26 outputs an "OTDR OK" signal over output 34 to control circuit 30 to indicate that OTDR 26 is working properly. Next, the "test distance" input 32 is received by OTDR 26 from control circuit 30. As discussed above, the "test distance" input 32 indicates a specific optical path distance which OTDR 26 should monitor.

Next, OTDR 26 confirms the initial integrity of the specified distance of the optical path of the system, i.e., the optical path extending from OTDR 26, through couplers 28 and 22, and fiber system 12. To confirm the integrity of the optical path of the system, OTDR 26 transmits a plurality of optical pulses at wavelength $\lambda_s$ along the optical path. Detection and threshold circuitry in OTDR 26 determine the integrity of the optical fiber path based on the return scattering of light at wavelength $\lambda_s$.

In the event that OTDR 26 detects a fiber break or other fault in the optical path, OTDR 26 outputs a "clear-path absent" signal on output 34 to control circuit 30. In response to the "clear-path absent" signal, control circuit 30 outputs a "laser disable" signal on output 36 to disable laser 24.

In the event that OTDR 26 confirms the integrity of the optical path (i.e., no breaks or faults detected in the path), OTDR 26 outputs a "clear-path present" signal on output 34 to control circuit 30. In response to the "clear-path present" signal, control circuit 30 outputs a "laser enable" signal on output 36 to enable or activate laser 24.

Once laser 24 has been enabled, OTDR 26 continuously monitors the integrity of the optical path by transmitting a plurality of optical pulses and monitoring the return signals. If at any time OTDR 26 detects a fiber break or other fault anywhere in the optical path (including extended portion 16), OTDR 26 immediately outputs a "clear-path absent" signal over output 34. In response, control circuit 30 outputs a "laser disable" signal over output 36 to disable laser 24. In this manner, high power laser 24 is interlocked to an optical path monitoring OTDR 26 and control circuit 30 for automatically shutting down or disabling laser 24 immediately after a fiber break or other fault is detected in the optical path.

The wavelength $\lambda_s$ of OTDR 26 should be selected to be significantly less that the wavelength ($\lambda_p$) of high power laser 24 to minimize Raman crosstalk and non-linear coupling in extended portion 16 of fiber system 12. For example, with a wavelength ($\lambda_p$) for laser 24 of 1480 nm, a wavelength ($\lambda_s$) for OTDR 26 may be chosen to be 1310 nm or 1360 nm to minimize non-linear coupling.

Figure 2:
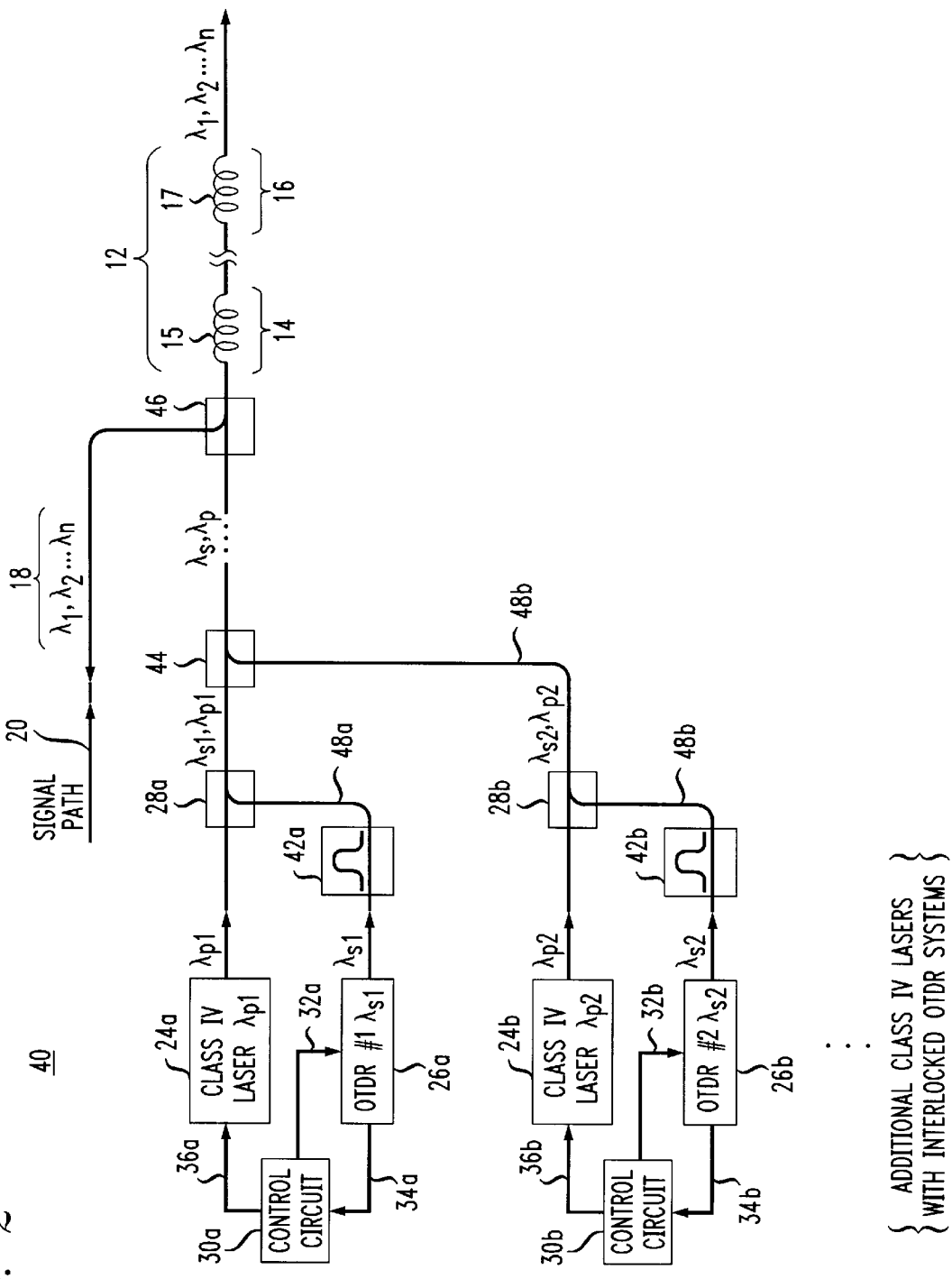
FIG. 2 illustrates a block diagram of an in-fiber safety interlock system according to a second embodiment of the present invention.

FIG. 2 illustrates a block diagram of an in-fiber safety interlock system according to a second embodiment of the present invention. The in-fiber interlock system 40 illustrated in FIG. 2 includes a plurality of high power (Class IV) laser sources 24a, 24b transmitting over a fiber system 12. Fiber system includes terminal portion 14 and extended portion 16. A first laser 24a operates at a wavelength $\lambda_{p1}$, while the second laser 24b operates at a wavelength $\lambda_{p2}$. Each of lasers 24a and 24b is interlocked to its own optical path monitoring OTDR, OTDRs 26a and 26b, respectively. The first OTDR 26a operates at a wavelength $\lambda_{s1}$, and the second OTDR 26b operates at a wavelength $\lambda_{s2}$.

Similar to the control circuit 30 in the first embodiment (FIG. 1), a first control circuit 30a is connected to first OTDR 26a and first laser 24a for selectively enabling or disabling first laser 24a based on information received from first OTDR 26a. A second control circuit 30b is similarly connected to a second OTDR 26b and second laser 24b for selectively enabling or disabling second laser 24b based on information received from second OTDR 26b.

An optical bandpass filter 42a is connected to the output path of the first OTDR 26a and passes only the wavelength ($\lambda_{s1}$) output by the first OTDR 26a, and rejects other wavelengths. Bandpass filter 42a ensures that first OTDR 26a will sense only its own return signal ($\lambda_{s1}$) by rejecting all other wavelengths including the return signal from the second OTDR 26b ($\lambda_{s2}$). A second bandpass filter 42b is connected to the second OTDR 26b and similarly passes only the wavelength ($\lambda_{s2}$) of the second OTDR 26b. Bandpass filter 42b ensures that second OTDR 26b will sense only its own return signal ($\lambda_{s2}$). In this manner, bandpass filters 42a and 42b allow multiple OTDRs 26a and 26b operating at different wavelengths to monitor the same (or a common) optical path without interfering with each other.

An optical coupler 28a combines the signal $\lambda_{p1}$ output by first laser 24a and the signal $\lambda_{s1}$ output by first OTDR 26a. Similarly, optical coupler 28b combines the output of the second laser 24b and the output of the second OTDR 26b. Although only two lasers and OTDRs are illustrated in FIG. 1, additional high power lasers, OTDRs and associated control circuits and bandpass filters may be connected to the in-fiber interlock system 40 of FIG. 2.

Optical coupler 44 combines the signal ($\lambda_{p1}$ $\lambda_{s1}$) from the first laser 24a and first OTDR 26a with the signal ($\lambda_{p2}$ $\lambda_{s2}$). An optical coupler 46 combines the signals from the plurality of OTDRs and lasers ($\lambda_p$ $\lambda_s$) with the one or more WDM data signals 18 having wavelengths $\lambda_1$ $\lambda_2$ ... $\lambda_n$ carried over signal path 20 for transmission over fiber system 12.

The operation of the in-fiber safety interlock system 40 according to the second embodiment of the present invention may be understood with reference to FIG. 2. First OTDR 26a and first laser 24a operate in a manner similar to OTDR 26 and laser 24 described above in the first embodiment. First OTDR 26a continuously monitors the integrity of a first optical path including bandpass filter 42a, path 48a, couplers 28a, 44 and 46, terminal portion 14 and extended portion 16 of fiber system 12. In the event that first OTDR 26a detects a fiber break or other fault in the first optical path, OTDR 26a and control circuit 30a operate to disable first laser 24a.

Similarly, second OTDR 26b continuously monitors the integrity of a second optical path including bandpass filter 42b, path 48b, couplers 28b, 44 and 46, terminal portion 14 and extended portion 16 of fiber system 12. In the event that second OTDR 26b detects a fiber break or other fault in the second optical path, second OTDR 26b and control circuit 30b operate to disable second laser 24b.

Both OTDRS 26a, 26b simultaneously monitor both a separate (uncommon) fiber portion (path 48a and path 48b, respectively) and a common portion of their respective optical paths (extending through coupler 46, terminal portion 14 and extended portion 16 of fiber system 12). In the event that a fiber break is detected only in the path 48a by first OTDR 26a, first OTDR 26a and first control circuit 30a operate to immediately disable or shut down first laser 24a. In such a case, however, second laser 24b continues operating because there is no break or fault in the second optical path.

Likewise, in the event that a fiber break is detected in the path 48b by second OTDR 26b, second OTDR 26b and second control circuit 30b operate to immediately disable or shut down second laser 24b, while first laser 24a continues to operate normally.

When a fiber break is detected in any portion of the optical paths that are common to the lasers 24a, 24b, all lasers must be disabled or shut down. If a break exists in a common portion of two or more optical paths, all OTDRs monitoring the common section should detect the break and immediately disable or shut down their respective lasers. For additional safety, a separate controller or circuitry (not shown) may be connected to all control circuits and OTDRs to ensure that all lasers are disabled when a break is detected on a common portion of the paths by any one of the sensing OTDRs. This separate controller may, therefore, operate to detect a malfunctioning OTDR or other circuitry.

The wavelengths ($\lambda_{s1}$ $\lambda_{s2}$) of OTDRs 26a and 26b should be selected to be significantly less than both of the wavelengths ($\lambda_{p1}$ $\lambda_{p2}$) of high power lasers 24a and 24b to minimize Ramon scattering and non-linear coupling in extended portion 16 of fiber system 12. For example, with wavelengths $\lambda_{p1}$ $\lambda_{p2}$ of lasers 24a and 24b respectively at 1475 nm and 1495 nm respectively, the wavelengths $\lambda_{s1}$, $\lambda_{s2}$ for OTDRs 26a and 26b may be selected as 1310 nm and 1360 nm. Also, for example, the wavelength of one of the data signals 18 may be selected as 1555 nm.

FIG. 3 illustrates a block diagram of an in-fiber safety interlock system 50 according to a third embodiment of the present invention. The in-fiber interlock system 50 illustrated in FIG. 2 includes a plurality of high power (Class IV) laser sources 24a, 24b transmitting over a local fiber system including a terminal portion 14 and extended portion 16. Both lasers 24a and 24b operate at the same or similar wavelength $\lambda_p$. Each of lasers 24a and 24b is interlocked to its own optical path monitoring OTDR, OTDRs 26a and 26b, respectively. The first OTDR 26a operates at a wavelength $\lambda_{s1}$, and the second OTDR 26b operates at a wavelength $\lambda_{s2}$. Control circuits 30a and 30b selectively enable or disable lasers 24a and 24b respectively based on information received from OTDRs 26a and 26b respectively. Although not required, the interlock system 50 may also include a monitoring circuit 70 connected to lasers 24a and 24b and control circuits 30a and 30b for monitoring and coordinating the operation of lasers 24a and 24b.

Coupler 28a combines the output $\lambda_p$ from the first laser 24a with the output $\lambda_{s1}$ from the first OTDR 26a.

Coupler 28b combines the output $\lambda_p$ from the second laser 24b with the output $\lambda_{s2}$ from the second OTDR 26b. Because lasers 24a and 24b may operate together or separately, optical coupler 60 operates as an optical splitter/combiner and combines both outputs $\lambda_p$ from lasers 24a and 24b into a single signal and then splits this combined $\lambda_p$ signal across both paths 62 and 63. Coupler 60 also combines the output $\lambda_{s1}$ from the first OTDR 26a and the output $\lambda_{s2}$ from the second OTDR 26b and outputs this combined signal onto the path 62.

Optical coupler 52 operates as a splitter/combiner and splits the combined signal $\lambda_{s1}$ $\lambda_{s2}$ $\lambda_p$ from the output 62, with the signals $\lambda_p$, $\lambda_{s1}$ and $\lambda_{s2}$ being output on path 64 and the signal $\lambda_p$ being output on path 65. As a result, optical coupler 52 operates to route sensing signals $\lambda_{s1}$ and $\lambda_{s2}$ around local amplifier 15 to allow OTDRs 26a and 26b monitor a greater distance of extended portion 16.

Instead of routing both sensing signals $\lambda_{s1}$ and $\lambda_{s2}$ together around amplifiers 15 and 17 (using coupler 52 and path 64), signals $\lambda_{s1}$ and $\lambda_{s2}$ may be individually routed around optical amplifiers 15 and 17 by inserting two couplers on the paths behind (to the left of) coupler 60.

Coupler 58 combines the WDM data signals 18 having wavelengths $\lambda_1$ $\lambda_2$ ... $\lambda_n$ on signal path 66 with the signal $\lambda_p$ on path 63. The data signals 18 are amplified by local amplifier 15 in which the signal $\lambda_p$ acts as pump energy for amplifier 15. Optical coupler 56 operates as a splitter to split the signals passing through amplifier 15 into the data signals 18 ($\lambda_1$ $\lambda_2$ ... $\lambda_n$) and the signal $\lambda_p$ on path 65.

Two paths are formed for feeding the amplifying signal $\lambda_p$ to amplifier 15. A first path extends from coupler 60, path 63 and coupler 58. A second path is formed from coupler 60, path 62, coupler 52, path 65 and coupler 56. As a result, the amplifying signal $\lambda_p$ can be fed to amplifier 15 from both directions.

Coupler 54 combines data signals 18 ($\lambda_1$ $\lambda_2$ ... $\lambda_n$) from coupler 56 with OTDR signals $\lambda_{s1}$ and $\lambda_{s2}$ on path 64. The combined signal ($\lambda_{s1}$, $\lambda_{s2}$ and $\lambda_1$ $\lambda_2$ ... $\lambda_n$) is fed to extended portion 16.

Because the OTDRs 26a and 26b test the integrity of the optical paths by monitoring the back scattering (return signals) of the transmitted signals $\lambda_{s1}$ and $\lambda_{s2}$, the transmitted signals $\lambda_{s1}$ and $\lambda_{s2}$ are bidirectional. As a result, couplers 60 52, and 54 each operates as both a splitter and a combiner depending on the direction of OTDR signal flow.

The operation of the in-fiber safety interlock system 50 according to the third embodiment of the present invention may be understood with reference to FIG. 3. Lasers 24a and 24b are interlocked to OTDRs 26a and 26b, respectively. First OTDR 26a monitors a first optical path extending through bandpass filter 42a, path 48a, coupler 28a and a common path for both OTDRs (extending through coupler 60, path 62, coupler 52, path 64, coupler 54, and extended portion 16). Similarly, second OTDR 26b monitors the integrity of a second path extending through bandpass filter 42b, path 48b, coupler 28b and the common path.

In the event that the first OTDR 26a detects a fault in the first optical path (even within the extended portion 16), OTDR 26a and control circuit 30a operate to immediately disable or shut down laser 24a. Unless the fault is contained in the common path, second laser 24b need not be disabled and will remain operating.

In the event that second OTDR 26b detects a fault in the second optical path (even within the extended portion 16), second OTDR 26b and control circuit 30b operate to immediately disable or shut down laser 24b. In this case, unless the fault is contained in the common path, first laser 24a need not be disabled and will remain operating.

Lasers 24a and 24b can operate as redundant laser pump sources. Laser 24a and laser 24b are each separately capable of simultaneously pumping local amplifier 15. As a result, it is necessary to operate only one laser at a time. When only one of lasers 24a and 24b are operating, the enabled laser operates at 100% power. When both lasers are operating, both lasers, for example, may operate at 50% power. Alternatively, both lasers 24a and 24b may simultaneously operate at 100% power to increase the gain of amplifier 15.

Monitoring circuit 70, such as a microprocessor and/or other circuitry may be used to monitor the output power percentage of each laser 24a and 24b and automatically adjust or coordinate the output power of each laser 24a and 24b. Monitoring circuit 70 receives an electrical signal from both lasers 24a and 24b indicating whether each laser is on and the output power of each laser. Monitoring circuit 70 may also receive signals from circuits 30a and 30b indicating whether a break or fault has been detected, and the location of the fault.

For example, initially, both lasers 24a and 24b may be operating at 50% power. At some later time, first OTDR 26a detects a break or fault in the uncommon portion of the first optical path and immediately shuts down first laser 26a. Monitoring circuit 70 then controls the second laser 26b and control circuit 30b to increase the power output of second laser 26b to 100% to compensate for the loss of the first laser 26a. In this manner, amplifier 15 is provided with sufficient pump energy despite the fault in the first optical path and disabling of first laser 26a. The use of monitoring circuit 70 for monitoring the system and automatically adjusting power output may be similarly applied to the system illustrated in FIG. 2.

It should, of course, be understood that while the present invention has been described in reference to specific hardware configurations, alternate configurations are possible. For example, instead of using couplers, the embodiments of the present invention may employ combiners, splitters, wavelength multiplixers, polarization multiplixers or ratio splitters/combiners where appropriate.

What is claimed is:

1. An in-fiber safety interlock system using OTDR, comprising:

a high power laser coupled to a fiber system including a terminal portion and an extended portion;

an OTDR system including a laser transmitter having a wavelength selected to minimize non-linear coupling in the extended portion of the fiber system;

a wavelength selective coupler coupling said high power laser and said OTDR system to the fiber system;

a control circuit coupled to said high power laser and said OTDR system, said control circuit enabling said high power laser when said OTDR system detects integrity of optical path of the fiber system.

2. An in-fiber safety interlock system using OTDR, comprising:

a high power laser coupled to a terminal portion of a fiber system, said fiber system also including an extended portion;

an OTDR system coupled to the terminal portion of the fiber system, said OTDR system including a laser transmitter having a wavelength selected to minimize non-linear coupling in the extended portion of the fiber system;

a wavelength selective coupler coupling said high power laser and said OTDR system to the fiber system;

a control circuit coupled to said high power laser and said OTDR system, said switch controller enabling said high power laser when said OTDR system detects integrity of optical path of the fiber system.

3. An in-fiber safety interlock system using OTDR, comprising:

a first high power laser coupled to a fiber system;

a first OTDR system including a laser transmitter having a first wavelength selected to minimize non-linear coupling in the fiber system;

a first wavelength selective coupler coupling said first high power laser and said OTDR system to the fiber system;

a second high power laser coupled to the fiber system;

a second OTDR system including a laser transmitter having a second wavelength selected to minimize non-linear coupling in the fiber system, said second wavelength being different from said first wavelength;

a second wavelength selective coupler coupling said second high power laser and said second OTDR system to the fiber system;

a second control circuit coupled to said second high power laser and said second OTDR system, said second control circuit enabling said second high power laser when said second OTDR system detects integrity of optical path of the fiber system.

4. The system of claim 3 and further comprising a third wavelength selective coupler coupling signals from the first wavelength selective coupler and signals from said second wavelength selective coupler to the fiber system.

5. The system of claim 3 and further comprising:

a first optical bandpass filter coupled to said first OTDR system and to said first wavelength selective coupler, said first optical bandpass filter passing optical signals only at approximately the first wavelength; and a second optical bandpass filter coupled to said second OTDR system and to said second wavelength selective coupler, said second optical bandpass filter passing optical signals only at approximately the second wavelength.

6. The system of claim 3 wherein said optical path of the fiber system includes a first optical path monitored by the first OTDR system and a second optical path monitored by the second OTDR system, at least a portion of first optical path being common to the second optical path.

7. The system of claim 3 and further comprising a monitoring circuit coupled to said first and second high power lasers and to said first and second control circuits, said monitoring circuit for coordinating the operation of said first and second high power lasers based on signals provided from the first and second control circuits.

8. The system of claim 7, wherein said monitoring circuit adjusts the power of the first high power laser based on whether or not the second high power laser is enabled, and adjusts the power of the second high power laser based on whether or not the first high power laser is enabled.

9. An in-fiber safety interlock system comprising:

means for transmitting a high power laser signal onto the fiber system;

means for transmitting a plurality of low power optical pulses onto the fiber system, the wavelength of said low power optical pulses selected to minimize non-linear coupling in the extended portion of the fiber system;

means for coupling the high power laser signal and the low power optical pulses onto the fiber system;

means for detecting the integrity of the optical path based on the return signal of the low power optical pulses; and means for enabling the high power laser only if the integrity of the optical path of the fiber system has been detected.

10. A method of monitoring the integrity of a fiber system using an OTDR, the fiber system including a terminal portion and an extended portion, said method comprising the steps of:

transmitting a plurality of low power optical pulses onto the fiber system, the wavelength of said low power optical pulses selected to minimize non-linear coupling in the extended portion of the fiber system;

detecting the integrity of the optical path based on the return signal of the low power optical pulses;

transmitting a high power laser signal onto the fiber system using a high power laser only if the integrity of the optical path of the fiber system has been detected; and coupling the high power laser signal and the low power optical pulses onto the fiber system.

11. The method of claim 10 and further comprising the steps of:

performing a built in self-test on the OTDR prior to enabling the high power laser; and enabling the high power laser only if the OTDR passes the built-in self test and the integrity of the optical path has been detected.

12. The method of claim 10 and further comprising the steps of:

performing a built in self-test on the OTDR during operation of the high power laser; and disabling the high power laser if the OTDR fails the built-in self test.

13. The method of claim 10 and further comprising the step of receiving a test distance value at the OTDR;

wherein said step of detecting comprises the step of detecting the integrity of a portion of the optical path extending the test distance based on the return signal of the low power optical pulses.

14. The method of claim 10 wherein the wavelength of the OTDR system is selected to be significantly less than the wavelength of the high power laser to minimize non-linear coupling in the fiber system.

15. A method of monitoring the integrity of a fiber system using one or more OTDRs, said method comprising the steps of:

using a first OTDR to transmit a plurality of low power optical pulses at a first wavelength onto the fiber system, the first OTDR monitoring a first optical path of the fiber system including a first separate portion and a common portion;

using the first OTDR to detect the integrity of the first optical path based on the return signal of the low power optical pulses at the first wavelength;

transmitting a first high power laser signal onto the fiber system using the first high power laser only if the integrity of the first optical path of the fiber system has been detected;

coupling the first high power laser signal and the low power optical pulses of the first wavelength onto the fiber system;

using a second OTDR to transmit a plurality of low power optical pulses at a second wavelength onto the fiber system, the second wavelength being different from the first wavelength, the second OTDR monitoring a second optical path of the fiber system including a second separate portion and the common portion;

using the second OTDR to detect the integrity of the second optical path based on the return signal of the low power optical pulses at the second wavelength;

transmitting a second high power laser signal onto the fiber system using the second high power laser only if the integrity of the second optical path of the fiber system has been detected;

coupling the second high power laser signal and the low power optical pulses of the second wavelength onto the fiber system.

16. The method of claim 15 and further comprising the steps of:

filtering any return signals input to the first OTDR to pass only the low power optical pulses at the first wavelength; and filtering any return signals input to the second OTDR to pass only the low power optical pulses at the second wavelength.

17. The method of claim 15 and further comprising the steps of:

using the first OTDR to detect the location of a fault, if any, in the first optical path; and using the second OTDR to detect the location of a fault, if any, in the second optical path.

18. The method of claim 17 and further comprising the steps of:

disabling only the first high power laser if a fault is detected only in the first separate portion;

disabling only the second high power laser if a fault is detected only in the second separate portion; and disabling both the first and second high power lasers if a fault is detected in the common portion.

* * * * *